United States Patent

Maeshiba

[15] 3,686,947
[45] Aug. 29, 1972

[54] DEVICE FOR MEASURING THE QUANTITY OF LIQUID PASSING THROUGH A PIPE

[72] Inventor: Sozaburo Maeshiba, 118 Sumiyoshi, Fukuoka, Japan

[22] Filed: Nov. 21, 1969

[21] Appl. No.: 878,743

[30] Foreign Application Priority Data

March 5, 1969 Japan ..................... 44/21914

[52] U.S. Cl. .................................................. 73/229
[51] Int. Cl. ............................................. G01f 1/00
[58] Field of Search ........... 73/230, 231, 229, 194 M

[56] References Cited

UNITED STATES PATENTS

| | | |
|---|---|---|
| 76,166 | 3/1868 | Cordnan ..................... 73/231 |
| 319,134 | 6/1885 | Schneider ................... 73/230 |
| 1,463,865 | 8/1923 | Blair ........................... 73/231 |
| 3,279,496 | 10/1966 | Klass et al. .................. 73/231 |
| 720,188 | 2/1903 | Seidener ................. 73/194 M |
| 3,564,918 | 2/1971 | Ziniuk et al. ............. 73/231 R |

*Primary Examiner*—Richard C. Queisser
*Assistant Examiner*—Arthur E. Korkosz
*Attorney*—Holcombe, Wetherill & Brisebois

[57] ABSTRACT

The present invention relates to a device for measuring the quantity of liquid passing through a pipe or the like in which two strainers are provided in front and back of a moving vane installed in the pipe, and the end of the shaft on which said moving vane is mounted projects out of the pipe and is connected directly or indirectly to an integrating meter.

2 Claims, 12 Drawing Figures

Patented Aug. 29, 1972

DEVICE FOR MEASURING THE QUANTITY OF LIQUID PASSING THROUGH A PIPE

SUMMARY OF THE INVENTION

The present invention relates to a device for measuring the quantity of liquid passing through a pipe or the like.

The primary object of the present invention is to provide a simple device for measuring the quantity of liquid passing through a pipe or the like, by means of which the flow of liquid can be measured quickly, with both ease and accuracy.

In conventional devices, an impeller is mounted in a pipe, and the quantity of liquid passing the the pipe is measured by counting the revolutions of said impeller. These devices, however, all involve a turbulent flow or a partial flow illustrated schematically in FIG. 12-B. Accordingly, the measurement of the quantity of liquid is apt to be incorrect because the liquid flows at an unequal rate in various parts of the pipe. In addition, since the pressure is unequally applied to the moving vane, the construction strains easily. Consequently the construction must be complex and expensive.

Other objects of the present invention will be better understood from the following description of several embodiments of the present invention, with reference to the accompanying drawings in which.

Figure 1:
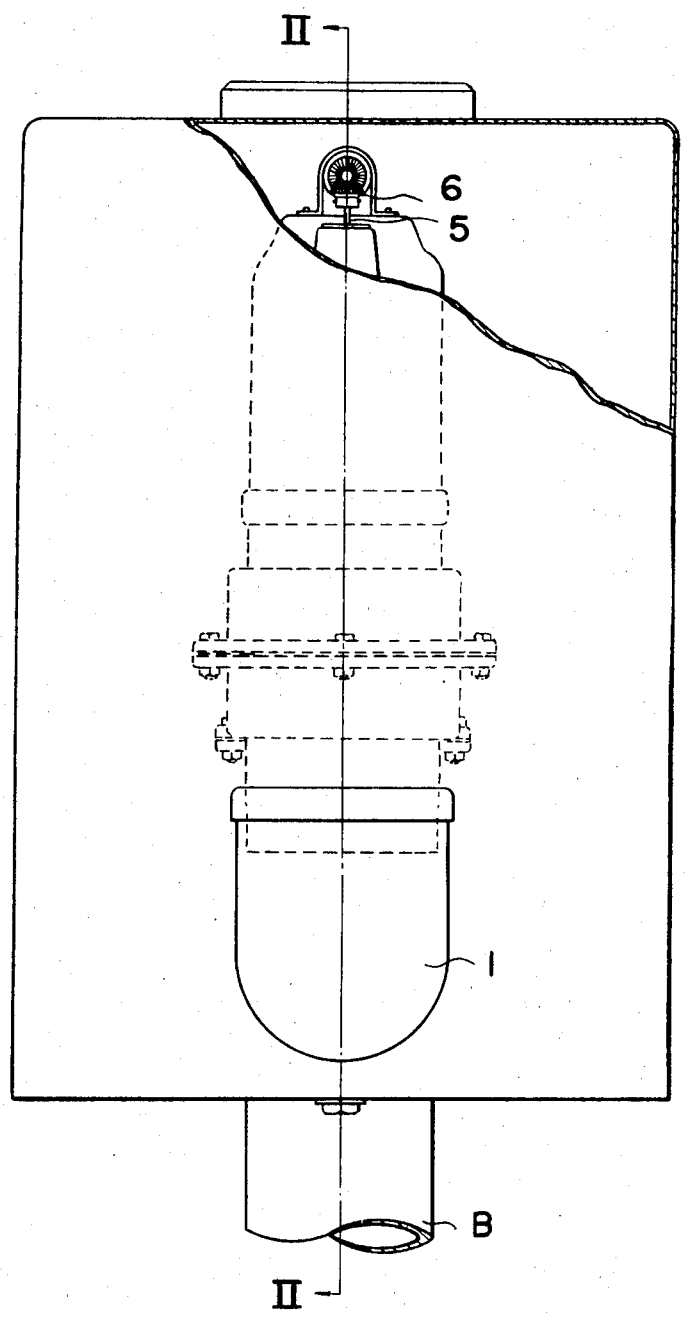
FIG. 1 is a vertical view showing the first embodiment of the present invention, a device for measuring the quantity of liquid passing through a pipe, with the cover partly broken away.
Figure 2:
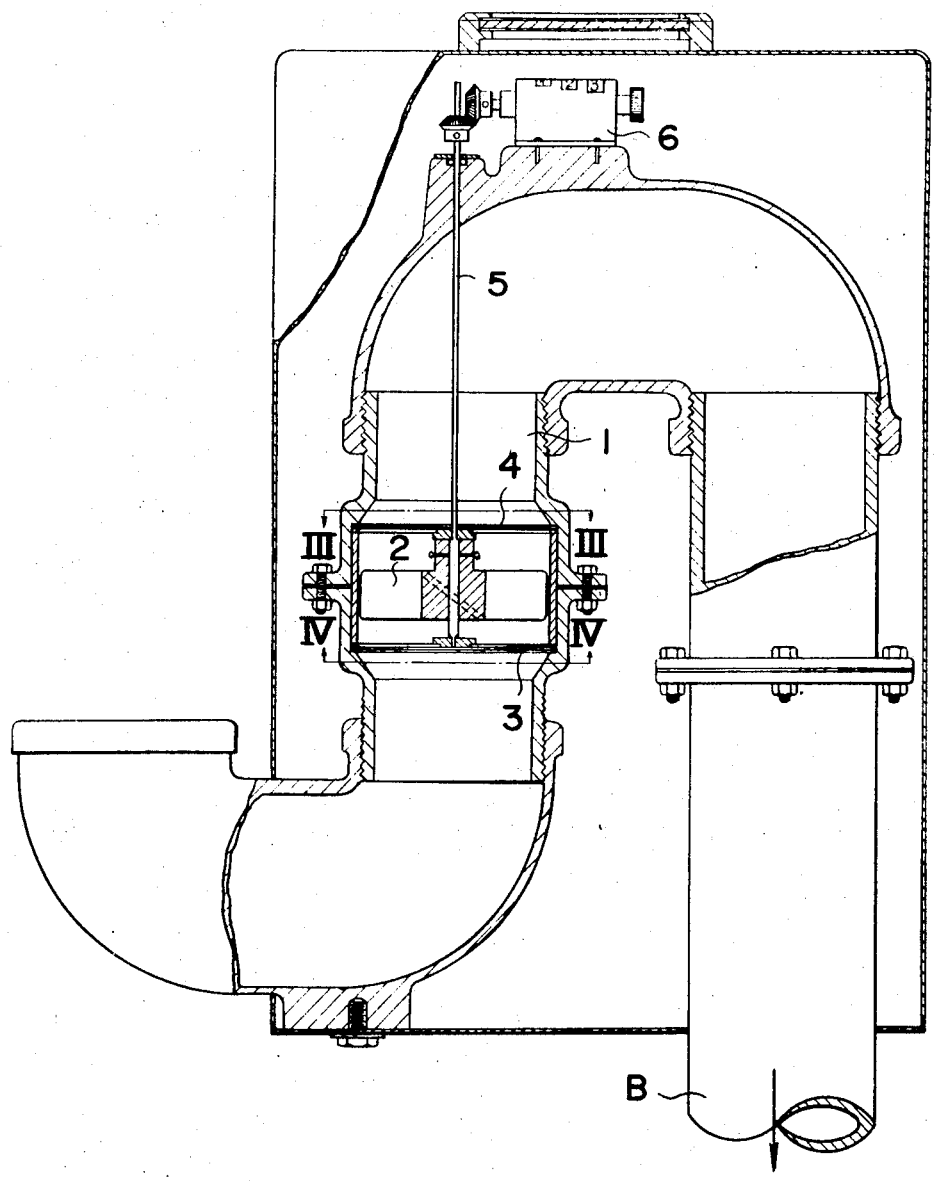
FIG. 2 is a vertical section taken along the line II—II of FIG. 1.
Figure 3:
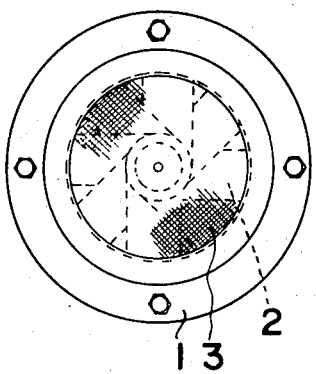
FIG. 3 is a transverse section taken along the line III—III of FIG. 2.
Figure 4:
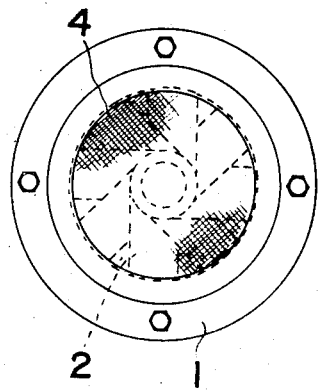
FIG. 4 is a transverse section taken along the line IV—IV of FIG. 2.
Figure 5:
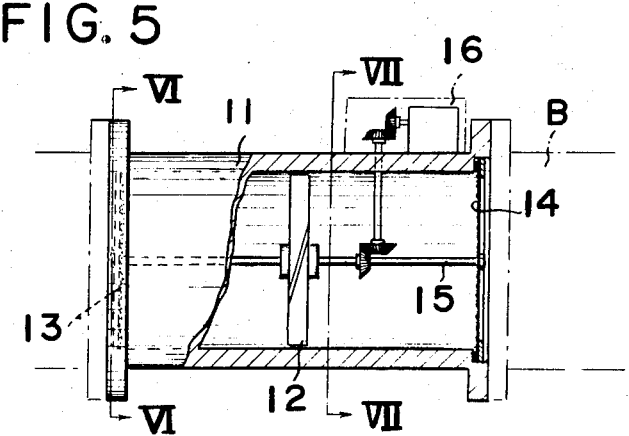
FIG. 5 is a vertical view, partly in section, showing a second embodiment of the present invention.
Figure 6:
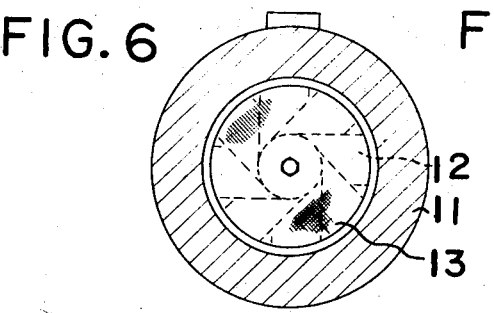
FIG. 6 is a transverse section taken along the line VI—VI of FIG. 5.
Figure 7:
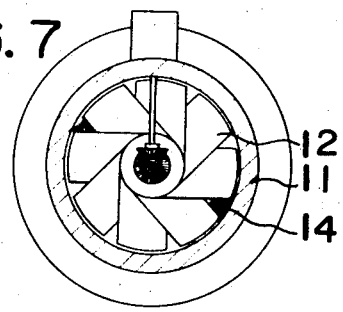
FIG. 7 is a transverse section taken along the line VII—VII of FIG. 5.
Figure 8:
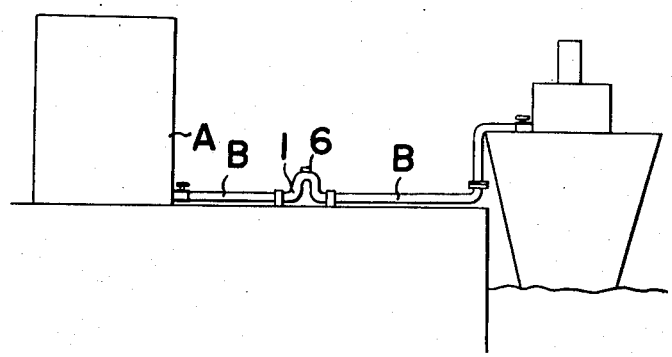
FIG. 8, FIG. 9, FIG. 10 and FIG. 11 illustrate various specific applications of the present invention.
Figure 9:
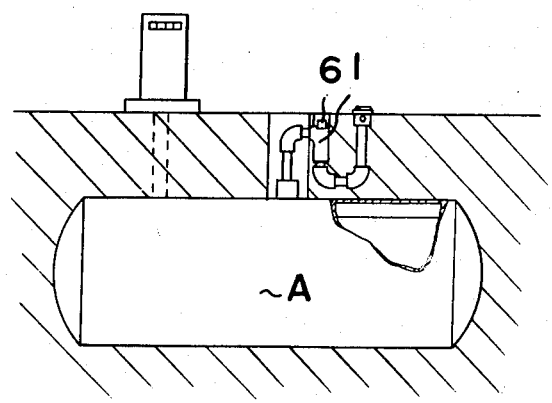
Figure 10:
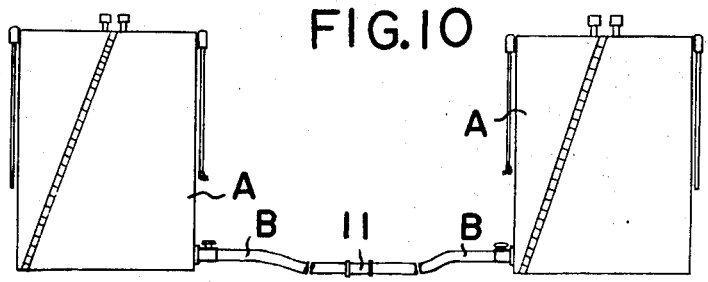

Referring now to the drawings, these show a device in which a moving vane is installed in a pipe, a first strainer and a second strainer are arranged in front and in back of the moving vane, and the end of the shaft on which the moving vane is mounted projects from the pipe and is connected directly or indirectly to an integrating meter.

The first embodiment of this invention will be now described.

As shown in FIGS. 1–4 and FIGS. 8–9, a curved pipe 1 is connected to the supply port of a gasoline tank A or midway of a pipe B, one end of which is connected to the supply port of a gasoline tank. A moving vane 2 is mounted in a vertical portion of the curved pipe 1. A first strainer 3 made of a wire-netting, a slotted plate or the like is installed in front of the moving vane 2, and a similar second strainer 4 is mounted in the rear thereof. One end of the shaft 5 carrying said moving vane 2 projects from the curved pipe and is connected directly or indirectly to an integrating meter 6. After the measuring device is installed as described above, the amount of gasoline or the like is discharged continuously from the supply port of a gasoline tank A.

Figure 12:
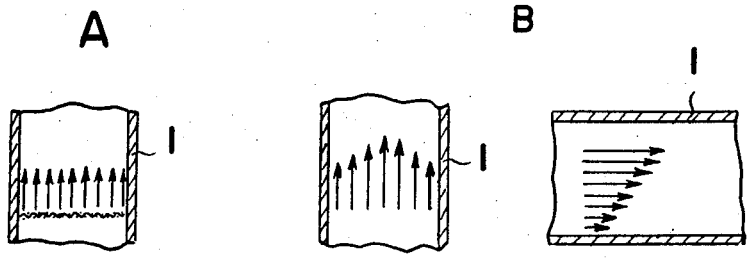
FIG. 12 schematically represents the conditions of flow within a pipe.

The liquid flows turbulently through the pipe 1, and when it reaches the lower end of the standing portion of the curved pipe 1, the force of the water is somewhat reduced because the flow begins to rise at that point. The flow is turned into a uniform flow, that is, a laminar flow as shown in FIG. 12-A by the action of the first strainer 3. The flow is additionally controlled by the second strainer 4, so the liquid gasoline passes through the pipe 1 in such a way that the pipe is filled with it at all times. Consequently, the amount of liquid is measured correctly without any loss by multiplying the number of revolutions of the moving vane 2 shown in the integrating meter 6 by the sectional area of the pipe at the position of the rotating vane.

The second embodiment of this invention will now be described. As shown in FIGS. 5–7 and FIG. 10, a straight pipe 11, which has a first strainer 13 on the inlet side thereof and a second strainer 14 on the discharge side thereof, is connected in a pipe B. A water wheel 12 is installed between the two rectifying strainers 13, 14, and a shaft 15 on which the water wheel 12 is mounted projects from the pipe 11 and is connected directly or indirectly to an integrating meter 16. Accordingly, when the liquid is discharged through the inlet side of the pipe B from gasoline tank A, the liquid fuel flowing turbulently is directed into laminar flow by the action of the first rectifying strainer 13, and causes the water wheel 12 to revolve under conditions such the the liquid flowing through the pipe occupies its entire crosssection Moreover, the second rectifying strainer 14 behind of the water wheel 12 reduces the force of the flow and complements the action of the first rectifying strainer 13. Consequently, as the number of revolutions of the water wheel 12 is transmitted directly or indirectly to an integrating meter 16 outside the pipe, the quantity of liquid passing through the pipe is indicated by the number indicated on the integrating meter.

In this embodiment, the quantity of liquid passing through the pipe is measured correctly and instantaneously in spite of the fact that the device is simple and inexpensive.

Figure 11:
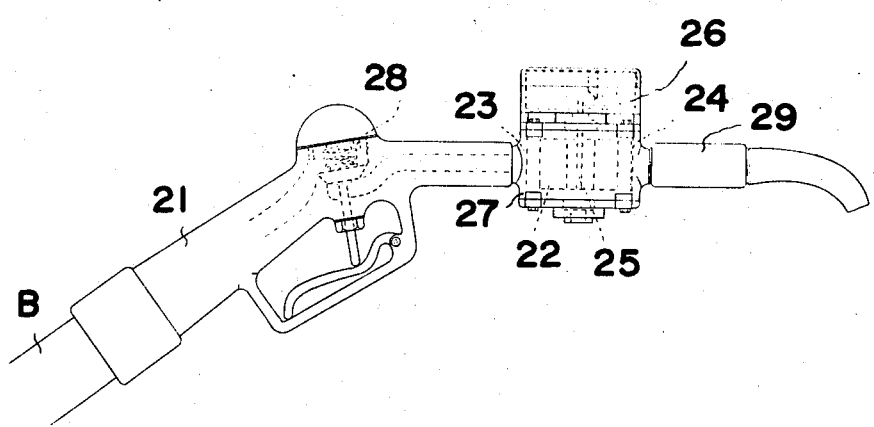

The particular application illustrated in FIG. 11 will now be described.

A nozzle 21 comprises rotor box 27, in which a rotating member 22 is mounted on the end of the gasoline pipe B connected to a suction pump, (not shown). A first strainer 23 and a second strainer 24 are installed in front and back of the rotating member 22, and an integrating meter 26, to which rotation of the rotating member 22 is transmitted directly or indirectly through the shaft 25 of the rotating member 22, is mounted on the rotor box 27. A valve 28 is mounted in the nozzle 21 between the pipe B and the rotor box 27, and a check valve 29 is attached to the front end of the rotor box 27.

In this embodiment, after the end of the nozzle 21 is inserted in the inlet of a gasoline tank, the valve 28 is opened, and then the liquid of gasoline begins to flow through the gasoline pipe B, the valve 28 and the rotor box 27. While the gasoline is flowing through the rotor box 27, it is directed into a laminar flow pattern by the first and second strainers. The revolutions of the rotating member 22 are transmitted to the integrating meter 26 through the shaft 25 of the rotating member 22, and the resulting total is indicated on the integrating meter 26.

In this embodiment, since the integrating meter 26 indicating the quantity of inflowing gasoline is mounted on the nozzle, the pillar-mounted meter conventionally used in filling stations becomes unnecessary. Accordingly maximum use of a limited area of available ground can be made and the station can be equipped at low cost. The quantity of liquid can be measured correctly without straining the structural components of the valve because turbulent flow is converted to laminar flow by the strainers.

What is claimed is:

1. A device for measuring the quantity of liquid passing through a pipe, said device comprising and S-shaped pipe section having a central portion extending in a direction having a substantially vertical component, with the inlet end of said central portion below its outlet, a shaft coaxial with said central portion and extending through the wall of said pipe section at one end of said central portion, a vane in said central portion mounted to rotate with said shaft, a meter mounted outside said pipe and connected to be driven by said shaft, a first strainer thinner than the diameter of the apertures therein mounted between said vane and the inlet end of said pipe section and a second strainer thinner than the diameter of the apertures therein mounted between the outlet end of said pipe section and said vane.

2. A device as claimed in claim 1 in which said central portion is substantially vertical.

* * * * *